United States Patent Office 3,474,464
Patented Oct. 21, 1969

3,474,464
PROCESS FOR PREPARING ACETYLACETONATES
John C. Matthews, Nashua, N.H., and Louis L. Wood, Washington, D.C., assignors to W. R. Grace & Co., New York, N.Y., a corporation of Connecticut
Filed Aug. 3, 1967, Ser. No. 658,051
Int. Cl. C07f 3/06, 15/00, 1/08
U.S. Cl. 260—429                                    8 Claims

ABSTRACT OF THE DISCLOSURE

In abstract, this invention is directed to a process for preparing metal acetylacetonates by reacting excess 2,4-pentanedione with a metal oxide or hydroxide to form a solution of the resulting metal acetylacetonate in the excess 2,4 - pentanedione, cooling said solution to precipitate the metal acetylacetonate, separating and recovering the thus precipitated acetylacetonate.

---

This invention is in the field of metal acetylacetonates.

Prior art methods for preparing metal acetylacetonates from 2,4 - pentanedione and metallic oxides or hydroxides have comprised; (a) heating the pentanedione with an aqueous suspension of a hydrous oxide or hydroxide; or (b) heating the pentanedione with metallic oxides in the presence of an inert (nonaqueous) solvent (e.g., benzene, toluene, or carbon tetrachloride). Such methods were slow and resulted in the formation of metal acetylacetonates which were contaminated with unreacted metallic oxides or hydroxides.

In summary, this invention is directed to a process for preparing metal acetylacetonates, said process comprising (a) forming a reaction mixture by adding a particulate solid substantially dry metallic compound selected from the group consisting of $Al_2O_3$, $Al(OH)_3$, $BaO$, $Ba(OH)_2$, $BeO$, $Be(OH)_2$, $CdO$, $Cd(OH)_2$, $CaO$, $Ca(OH)_2$, $Cr_2O_3$, $Cr(OH)_3$, $CoO$, $Co(OH)_2$, $Co_2O_3$, $$Co(OH)_3$$

$CuO$, $Cu(OH)_2$, $In_2O_3$, $In(OH)_3$, $FeO$, $Fe(OH)_2$, $Fe_2O_3$, $Fe(OH)_3$, $PbO$, $Pb(OH)_2$, $MgO$, $Mg(OH)_3$, $MnO$, $$Mn(OH)_2$$

$Mn_2O_3$, $Mn(OH)_3$, $MoO_2$, $Mo(OH)_4$, $NiO$, $Ni(OH)_2$, $KOH$, $NaOH$, $LiOH$, $ThO_2$, $Th(OH)_4$, $TiO_2$, $$Ti(OH)_4$$

$V_2O_3$, $V(OH)_3$, $VO_2$, $V(OH)_4$, $ZnO$, $Zn(OH)_2$, $ZrO_2$, and $Zr(OH)_4$, and substantially dry 2,4-pentadiene to a reaction zone, said metallic compound being added at the rate of one equivalent weight of metallic compound per 2-10 moles (optimum 3-5 moles) of said pentanedione; (b) heating and reacting said reaction mixture at a temperature of about 50–150° C. (optimum 75–100° C.) under a pressure of about 0.5–15 pounds per square inch absolute; (c) forming a first liquid mixture, said first mixture consisting essentially of 2,4 - pentanedione and water, by condensing vapors formed during said heating and reacting, said vapors consisting essentially of 2,4-pentanedione and water, said water being that originally present in the first reaction mixture plus water formed by reaction between the 2,4 - pentanedione and the metallic compound; (d) collecting said first liquid mixture; (e) separating said first liquid mixture into; (i) an organic phase, said organic phase consisting essentially of 2,4-pentanedione substantially saturated with water, and (ii) an aqueous phase, said aqueous phase consisting essentially of water saturated with 2,4 - pentanedione; (f) recycling said organic phase to the reaction zone; (g) forming a second liquid mixture by heating the reaction mixture until the particulate solid metallic compound dissolves, said second liquid mixture consisting essentially of metal acetylacetonate dissolved in 2,4 - pentanedione, said 2,4 - pentanedione being substantially saturated with water; (h) removing the second liquid mixture from the reaction zone; (i) crystallizing metal acetylacetonate from the second liquid mixture by cooling said second mixture to about 0–50° C. (optimum 20–30° C.); (j) separating the crystallized metal acetylacetonate from the unreacted 2,4 - pentanedione, said 2,4 - pentanedione being substantially saturated with said metal acetylacetonate and water; (k) recovering the crystallized metal acetylacetonate, said metal acetylacetonate being a substantially dry, particulate, crystalline solid substantially free of impurities selected from the group consisting of metal oxides and metal hydroxides; and (l) recovering the aforesaid unreacted 2,4 - pentanedione, said pentanedione consisting essentially of 2,4-pentanedione saturated with metal acetylacetonate.

In preferred embodiments this invention is directed to a process for preparing metal acetylacetonates, substantially as described in the above summary, in which:

(1) Unreacted 2,4 - pentanedione recovered from a prior run is used as at least a portion of the 2,4 - pentanedione which is added to the reaction zone in step (a) of said summary;

(2) A metal acetylacetonate is precipitated from the recovered unreacted 2,4 - pentanedione by adding a $C_5$ to $C_{14}$ paraffinic oil thereto, said oil being added in the rate of about 0.25–2.5 parts by weight (optimum, 0.3–1 part by weight) of said oil per part by weight of said recovered unreacted 2,4 - pentanedione, and the thus precipitated metal acetylacetonate is recovered;

(3) The separated metal acetylacetonate is washed with a $C_5$–$C_{14}$ paraffinic hydrocarbon and freed from said hydrocarbon before being recovered; and (4) The metallic compound is: (a) added at the rate of one equivalent weight of metal compound per 3–5 moles of 2,4 - pentanedione; (b) the reaction mixture is heated at about 75–110° C. under a pressure of about 1–5 pounds per square inch absolute; (c) the metal acetylacetonate is crystallized from the second liquid mixture by cooling said mixture to about 20–30° C.; and (d) metal acetylacetonate is precipitated from the recovered unreacted 2,4 - pentanedione by adding a $C_5$ to $C_{14}$ paraffinic oil thereto at the rate of about 0.3–1 part by weight of said oil per part by weight of said recovered unreacted 2,4-pentanedione.

In other preferred embodiments this invention is directed to zinc acetylacetonate and to its preparation, said embodiments comprising:

(1) A process for preparing zinc acetaylacetonate, said process comprising:

(a) Forming a reaction mixture by adding a particulate substantially dry zinc compound selected from the group consisting of $ZnO$ and $Zn(OH)_2$ and substantially dry 2,4-pentanedione to a reaction zone, said zinc compound being added at the rate of one equivalent of the zinc compound per 2–10 moles (optimum, 3–5 moles) of said pentanedione;

(b) Heating and reacting said reaction mixture at a temperature of about 50–150° C. (optimum, 75–100° C.) under a pressure of about 0.5–15 pounds per square inch absolute;

(c) Forming a first liquid mixture, said first liquid mixture consisting essentially of 2,4-pentanedione and water, by condensing vapors formed during said heating and reacting, said vapors consisting essentially of 2,4-pentanedione and water, said water being that originally present in the first reaction mixture plus water formed by a reaction between the 2,4-pentanedione and the zinc compound;

(d) Collecting said first liquid mixture;

(e) Separating said first liquid mixture into; (i) an organic phase, said organic phase consisting essentially of 2,4-pentanedione substantially saturated with water, and (ii) an aqueous phase, said aqueous phase consisting essentially of water saturated with 2,4-pentanedione;

(f) Recycling said organic phase to the reaction zone;

(g) Forming a second liquid mixture by heating the reaction mixture until the particulate solid zinc compound dissolves, said second liquid mixture consisting essentially of metal acetylacetonate dissolved in 2,4-pentanedione, said 2,4-pentanedione being substantially saturated with water;

(h) Removing the second liquid mixture from the reaction zone;

(i) Crystallizing zinc acetylacetonate from the second liquid mixture by cooling said mixture to about 0–50° C. (optimum, 20–30° C.);

(j) Separating the crystallized zinc acetylacetonate from the unreacted 2,4-pentanedione said 2,4-pentanedione being substantially saturated with said metal acetylacetonate and water;

(k) Recovering the crystallized zinc acetylacetonate, said zinc acetylacetonate being a substantially dry, particulate, crystalline solid substantially free of impurities selected from the group consisting of zinc oxides and metal hydroxides; and (l) Recovering the aforesaid unreacted 2,4-pentanedione, said pentanedione consisting essentially of 2,4-pentanedione saturated with zinc acetylacetonate.

In still other preferred embodiments where preparing zinc acetylacetonate by the above-described process;

(1) Unreacted 2,4-pentanedione recovered from a prior run is used as at least a portion of the 2,4-pentanedione which is added to the reaction zone in step (a) of said claim 1;

(2) Zinc acetylacetonate is precipitated from the recovered unreacted 2,4-pentanedione by adding a $C_5$ to $C_{14}$ paraffinic oil thereto, said oil being added in the rate of about 0.25–2.5 parts by weight (optimum, 0.3–1 part by weight) of said oil per part by weight of said recovered unreacted 2,4-pentanedione, and the thus precipitated zinc acetylacetonate is recovered; and (3) Zinc acetylacetonate is washed with a $C_5$–$C_{14}$ paraffinic hydrocarbon and freed from said hydrocarbon before being recovered.

The instant invention will be better understood by referring to the following specific but nonlimiting examples. It is understood that said invention is not limited by these examples which are being offered merely as illustrations and that modifications can be made without departing from the spirit or scope of the invention.

EXAMPLE I

A 6500 gram portion of substantially dry 2,4-pentanedione was placed in a reaction flask. Said flask communicated with a source of vacuum (ca. 2 pounds per square inch absolute pressure) and was provided with a reflux condenser which was arranged to discharge condensate into a Barrett type receiver. Substantially dry particulate zinc oxide (450 grams) which passed a 10 mesh U.S. Standard screen and substantially all of which passed a 100 mesh U.S. Standard screen was added to the 2,4-pentanedione in the flask and the resulting mixture was boiled under a partial vacuum (ca. 2 pounds per square inch absolute pressure) at about 70° C. until the zinc oxide dissolved. A second 450 gram portion of zinc oxide from the same lot was then added to the flask and the resulting mixture was again boiled under the aforesaid partial vacuum at about 70° C. until the zinc oxide dissolved. A third portion of said zinc oxide (235 grams) was added to the flask and the resulting mixture was boiled as before until the zinc oxide dissolved. During the reaction about 270 grams of water and about 1000 grams of 2,4-pentanedione were collected in the receiver. Intermittently water was separated from 2,4-pentanedione collected in the Barrett type receiver and the 2,4-pentanedione was (intermittently) returned to the reaction flask to maintain an excess of 2,4-pentanedione in the reaction flask at all times.

After the last portion of zinc oxide had dissolved in the reaction flask, its contents were allowed to cool to about 25° C., thereby to precipitate or crystallize, zinc acetylacetonate. The precipitate of zinc acetylacetone was separated from the mother liquid (2,4-pentanedione saturated with zinc acetylacetone) by filtration and the mother liquor was recovered. The thus separated zinc acetylacetonate was washed with about 1500 grams of heptane, "dried" (i.e., substantially freed of heptane) by exposing to dry air at about 25–100° C., recovered, and weighed.

The recovered dry zinc acetylacetone crystals were white and free of colored material. The weight of these crystals corresponded to a conversion (one pass yield) of 75% of theory.

The mother liquor (2,4-pentanedione saturated with zinc acetylacetonate) recovered from this run was used as a source of 2,4-pentanedione in a subsequent run.

EXAMPLE II

The general procedure of Example I was repeated. However, in the run the quantities of reactants used were; 2,4-pentanedione, 5327 grams; and zinc oxide, 908 grams. The zinc oxide was added in two portions of 454 grams each. In this instance the recovered zinc acetylacetonate corresponding to a conversion of 71% of theory. The product was a white, crystalline solid which was free of colored material.

EXAMPLE III

The general procedure of Example I was repeated, but in this instance the zinc oxide was replaced with 1385 grams of $Zn(OH)_2$.

In this instance the recovered zinc acetylacetonate corresponded to a conversion of 73% of theory.

EXAMPLE IV

The general procedure of Example I was repeated. However, in this instance the zinc oxide was replaced with 1795 grams of cadmium oxide.

In this instance the recovered slightly off-white crystalline cadmium acetylacetonate corresponds to a conversion of about 70% of theory.

EXAMPLE V

The general procedure of Example I was repeated. However, in this instance the zinc oxide was replaced by 1485 grams of iron(III) oxide.

The recovered red crystalline iron(III) acetylacetonate corresponded to a conversion of about 68% of theory.

EXAMPLE VI

The general procedure of Example I was repeated. However, in this instance 6500 grams of 2,4-pentanedione and 568 grams of zinc oxide were used, and all of zinc oxide was added at one time (before starting the reaction by heating the mixture of 2,4-pentanedione and zinc oxide).

The white crystalline zinc acetylacetonate product was free of colored material. However, because of the large excess of unreacted 2,4-pentanedione present (which dissolved an appreciable portion of the zinc acetylacetonate product) the conversion was only about 31% of theory.

EXAMPLE VII

The general procedure of Example I was repeated. However, in this instance the reaction was conducted at a pressure of about 4 pounds per square inch absolute pressure, thereby increasing the boiling point of the reaction mixture and hence the temperature of the reaction mixture during reaction to about 95° C.

Results of this run were substantially the same at those obtained in Example I, supra.

Metal acetylacetonates made by the process of this invention have been used with excellent results to enhance the stability of chlorine containing polymers such as PVC (polyvinyl chloride) toward heat. Generally about 0.01–5% of metal acetylacetonate is used. Preferably the metal acetylacetonate is added to the chlorine containing resin along with a chlorine scavenger such as an organic ortho-ester or epoxy containing compound (e.g., epoxidized soybean oil). Usually the metal acetylacetonate is dry blended with the polymer and other additives—e.g., a chlorine scavenger, stabilizing additives, lubricating additives, and strength improving additives. The thus formed dry blends can then be mixed under heat and shear conditions, before extrusion, to form a homogenous mass which is then ready to be extruded.

As used herein the term "equivalent weight of metallic ion" means, for any given metallic ion, the atomic weight of said ion divided by the oxidation state, or oxidation number, of said ion in the compound under consideration. For example;

(1) In the case of $Fe_2O_3$, in which the oxidation number of the metallic (iron(III)) ion is 3, the equivalent weight of said ion is $55.85/3 = 18.62$; and (a) It follows that, since the formula weight (the so-called "molecular weight") of $Fe_2O_3$ is 159.70, one equivalent weight of iron(III) ion will be present in $159.70/3 \times 2 = 26.61$ units of said $Fe_2O_3$; and (2) In the case of FeO, in which the oxidation number of the metallic (iron(II)) ion is 2, the equivalent weight of said ion is $55.85/2 = 27.93$; and (a) It follows that, since the formula weight of FeO is 71.85, one equivalent weight of iron(II) ion will be present in $71.85/2 = 35.93$ units of said FeO.

Equivalent weight can be expressed in any convenient units of weight such as pounds, tons, ounces, grains, grams, and the like. (Where expressed in grams, equivalent weight is usually called "gram-equivalent weight," and where expressed in pounds, equivalent weight is usually called "pound-equivalent weight.") Thus, where the equivalent weight of the iron(III) ion is expressed in grams it follows that 26.61 grams of $Fe_2O_3$ will contain one gram equivalent weight (18.62 grams) of iron(III) ion; hence the equivalent weight of $Fe_2O_3$ is 26.61 weight units.

As used herein the term mole, as applied to a compound under consideration, means the molecular weight (more correctly, "formula weight") of said compound expressed in any convenient units of weight such as pounds, tons, ounces, grams, and the like (Where expressed in grams, moles are usually referred to as "gram-moles," and where expressed in pounds, moles are usually referred to as "pound-moles.")

It is obvious that consistent units must be used in any given run. For example, if the equivalent weight of a metallic ion is measured in grams (i.e., "gram equivalent weight") in a given run, the moles of 2,4-pentanedione used in said run must also be measured in grams (i.e., "gram-moles").

As used herein, the term "particulate form," as applied to metallic compounds, means that said compounds are present as distinct solid particles and that said particles will pass about a 10 mesh U.S. Standard screen (preferably about a 100 mesh U.S. Standard screen).

As used herein the term "substantially dry," as applied to solids and liquid materials means that such materials contain less than about 5% moisture (water) by weight (preferably less than about 1% moisture by weight), said total moisture includes water of hydration, dissolved water, adsorbed, and absorbed water.

For optimum results, it is preferred to use starting materials (metal oxids, metal hydroxides, and 2,4-pentanedione) which contain less than about 1% moisture. However, excellent results have been obtained with starting materials containing as much as about 5% moisture.

The term "dry" as applied to air in the expression "dry air" means that such air has a relative humidity of less than about 5%.

The term "percent" (%) as used herein, unless otherwise defined where used, means percent (parts per hundred) by weight.

What is claimed is:

1. A process for preparing metal acetylacetonates, said process comprising;

(a) forming a reaction mixture by adding a particulate solid substantially dry metallic compound selected from the group consisting of $Al_2O_3$, $Al(OH)_3$, BaO, $Ba(OH)_2$, BeO, $Be(OH)_2$, CdO, $Cd(OH)_2$, CaO, $Ca(OH)_2$, $Cr_2O_3$, $Cr(OH)_3$, CoO, $Co(OH)_2$, $Co_2O_3$ $Co(OH)_3$, CuO, $Cu(OH)_2$, $In_2O_3$, $In(OH)_3$, FeO, $Fe(OH)_2$, $Fe_2O_3$, $Fe(OH)_3$, PbO, $Pb(OH)_2$, MgO, $Mg(OH)_3$, MnO, $Mn(OH)_2$, $Mn_2O_3$ $Mn(OH)_3$, $MoO_2$, $Mo(OH)_4$, NiO, $Ni(OH)_2$, KOH, NaOH, LiOH, $ThO_2$, $Th(OH)_4$, $TiO_2$, $Ti(OH)_4$, $V_2O_3$, $V(OH)_3$, $VO_2$, $V(OH)_4$, ZnO, $Zn(OH)_2$, $ZrO_2$, and $Zr(OH)_4$, and substantially dry 2,4-pentanedione to a reaction zone, said metallic compound being added at the rate of one equivalent weight of metallic compound per 2–10 moles of said 2,4-pentanedione;

(b) heating and reacting said reaction mixture at a temperature of about 50–150° C. under a pressure of about 0.5–15 pounds per square inch absolute;

(c) forming a first liquid mixture, said first liquid mixture, said first liquid mixture consisting essentially of 2,4-pentanedione and water by condensing vapors formed during said heating and reacting, said vapors consisting essentially of 2,4-pentanedione and water, said water being that originally present in the first reaction mixture plus water formed by a reaction between the 2,4-pentanedione and the metallic compound;

(d) collecting said first liquid mixture;

(e) separating said first liquid mixture into; (i) an organic phase, said organic phase consisting essentially of 2,4-pentanedione substantially saturated with water, and (ii) an aqueous phase, said aqueous phase consisting essentially of water saturated with 2,4-pentanedione;

(f) recycling said organic phase to the reaction zone;

(g) forming a second liquid mixture by heating the reaction mixture until the particulate solid metallic compound dissolves, said second liquid mixture consisting essentially of metal acetylacetonate dissolved in 2,4-pentanedione, said 2,4-pentanedione being substantially saturated with water;

(h) removing the second liquid mixture from the reaction zone;

(i) crystallizing metal acetylacetonate from the second liquid mixture by cooling said mixture to about 0–50° C.;

(j) separating the crystallized metal acetylacetonate from the unreacted 2,4-pentanedione said 2,4-pentanedione being substantially saturated with said metal acetylacetonate and water;

(k) recovering the crystallized metal acetylacetonate, said metal acetylacetonate being a substantially dry, particulate, crystalline solid substantially free of impurities selected from the group consisting of metal oxides and metal hydroxides; and (l) recovering the aforesaid unreacted 2,4-pentanedione, said pentanedione consisting essentially of 2,4-pentanedione saturated with metal acetylacetonate.

2. The process of claim 1 in which recovered unreacted 2,4-pentanedione from a prior run is used as at least a portion of the 2,4-pentanedione which is added to the reaction zone in step (a) of said claim 1.

3. The process of claim 1 in which;

(a) a metal acetylacetonate is precipitated from the recovered unreacted 2,4-pentanedione by adding a C₅ to C₁₄ paraffinic oil thereto, said oil being added in the rate of about 0.25-2.5 parts by weight of said oil per part by weight of said recovered unreacted 2,4-pentanedione; and (b) the thus precipitated metal acetylacetonate is recovered.

4. The process of claim 1 in which the separated metal acetylacetonate is washed with a C₅-C₁₄ paraffinic hydrocarbon and freed from said hydrocarbon before being recovered.

5. A process for preparing zinc acetylacetonate, said process comprising;

(a) forming a reaction mixture by adding a particulate substantially dry zinc compound selected from the group consisting of ZnO and Zn(OH)₂ and substantially dry 2,4-pentanedione to a reaction zone, said zinc compound being added at the rate of one equivalent of the zinc compound per 2-10 moles of said pentanedione;

(b) heating and reacting said reaction mixture at a temperature of about 50-150° C. under a pressure of about 0.5-15 pounds per square inch absolute;

(c) forming a first liquid mixture, said first liquid mixture consisting essentially of 2,4-pentanedione and water by condensing vapors formed during said heating and reacting, said vapors consisting essentially of 2,4-pentanedione and water, said water being that originally present in the first reaction mixture plus water formed by a reaction between the 2,4-pentanedione and the zinc compound;

(d) collecting said first liquid mixture;

(e) separating sad first liquid mixture into; (i) an organic phase, said organic phase consisting essentially of 2,4-pentanedione substantially saturated with water, and (ii) an aqueous phase, said aqueous phase consisting essentially of water saturated with 2,4-pentanedione;

(f) recycling said organic phase to the reaction zone;

(g) forming a second liquid mixture by heating the reaction mixture until the particulate solid zinc compound dissolves, said second liquid mixture consisting essentially of zinc acetylacetonate dissolved in 2,4-pentanedione, said 2,4-pentanedione being substantially saturated with water;

(h) removing the second liquid mixture from the reaction zone;

(i) crystallizing zinc acetylacetonate from the second liquid mixture by cooling said mixture to about 0-50° C.;

(j) separating the crystallized zinc acetylacetonate from the unreacted 2,4-pentanedione, said 2,4-pentanedione being substantially saturated with said metal acetylacetonate and water;

(k) recovering the crystallized zinc acetylacetonate, said zinc acetylacetonate being a substantially dry, particulate, crystalline solid substantially free of impurities selected from the group consisting of zinc oxides and metal hydroxides; and (l) recovering the aforesaid unreacted 2,4-pentanedione, said pentanedione consisting essentially of 2,4-pentanedione saturated with zinc acetylacetonate.

6. The process of claim 1 in which recovered unreacted 2,4-pentanedione from a prior run is used as at least a portion of the 2,4-pentanedione which is added to the reaction zone in step (a) of said claim 1.

7. The process of claim 1 in which;

(a) zinc acetylacetonate is precipitated from the recovered unreacted 2,4-pentanedione by adding a C₅ to C₁₄ paraffinic oil thereto, said oil being added in the rate of about 0.25-2.5 parts by weight of said oil per part by weight of said recovered unreacted 2,4-pentanedione; and (b) the thus precipitated zinc acetylacetonate is recovered.

8. The process of claim 1 in which the separated zinc acetylacetonate is washed with a C₅-C₁₄ paraffinic hydrocarbon and freed from said hydrocarbon before being recovered.

References Cited

UNITED STATES PATENTS 2,845,465  7/1958  Cull et al. _____ 260—635
3,088,955  7/1963  Foos et al. _____ 260—429.1

OTHER REFERENCES

Menzies, J. Chem. Soc., 1934, p. 1757.
Fernelius et al., Inorganic Synthesis, vol. V (1957), pp. 108, 115–6.

TOBIAS E. LEVOW, Primary Examiner
A. P. DEMERS, Assistant Examiner

U.S. Cl. X.R.
260—45.75, 429.1, 429.3, 429.5 429.9, 438.1, 438.5, 435, 439, 448, 593